(12) United States Patent
Nimmer

(10) Patent No.: US 12,147,204 B2
(45) Date of Patent: Nov. 19, 2024

(54) PANEL MONITOR FOR RETROFITTING EXISTING CONTROL PANELS

(71) Applicant: Metropolitan Industries, Inc., Romeoville, IL (US)

(72) Inventor: James Andrew Nimmer, Minooka, IL (US)

(73) Assignee: Metropolitan Industries, Inc., Romeoville, IL (US)

( * ) Notice: Subject to any disclaimer, the term of this patent is extended or adjusted under 35 U.S.C. 154(b) by 420 days.

(21) Appl. No.: 17/716,700

(22) Filed: Apr. 8, 2022

(65) Prior Publication Data

US 2022/0326723 A1    Oct. 13, 2022

Related U.S. Application Data

(60) Provisional application No. 63/172,445, filed on Apr. 8, 2021.

(51) Int. Cl.
*G05B 15/02* (2006.01)
*H04W 84/02* (2009.01)

(52) U.S. Cl.
CPC ............ *G05B 15/02* (2013.01); *H04W 84/02* (2013.01)

(58) Field of Classification Search
None
See application file for complete search history.

(56) References Cited

U.S. PATENT DOCUMENTS

| 2014/0005810 A1* | 1/2014 | Frei ........................ H04L 43/065 700/90 |
| 2014/0159485 A1* | 6/2014 | Daniel .................... H02J 3/381 307/43 |
| 2017/0234709 A1* | 8/2017 | Mackie ................. G01M 3/243 73/861.08 |
| 2020/0203103 A1* | 6/2020 | Mendoza ............. G01R 15/202 |

FOREIGN PATENT DOCUMENTS

WO    WO-2008046370 A1 *    4/2008    ......... G08B 13/1409

\* cited by examiner

*Primary Examiner* — Roy Y Yi
(74) *Attorney, Agent, or Firm* — Levenfeld Pearlstein, LLC

(57) ABSTRACT

A panel monitor for retrofitting existing control panels is provided that includes a wide voltage range input. The wide voltage range input is capable of accepting digital signals ranging from 0V to about 500V. More particularly, the wide voltage range input can include at least one high voltage low current linear regulator coupled to a low input current opto-isolator. The panel monitor can further include a communication module that enables remote functionalities for the existing control panels.

6 Claims, 5 Drawing Sheets

PANEL MONITOR FOR RETROFITTING EXISTING CONTROL PANELS

CROSS-REFERENCE TO RELATED APPLICATIONS

This application claims priority to U.S. Provisional Patent Application No. 63/172,445 filed on Apr. 8, 2021 and titled "Panel Monitor for Retrofitting Existing Control Panels" which is hereby fully incorporated by reference as if set forth fully herein.

BRIEF SUMMARY OF THE INVENTION

This disclosure generally relates to control systems that sense water levels at a predetermined location and activate one or more pumps. Particularly, this disclosure relates to an apparatus that can be retrofitted with a wide range of existing control systems. More specifically, this disclosure relates to a panel monitor that can be retrofitted with or onto existing legacy control systems.

BACKGROUND OF THE INVENTION

Systems are known to sense water levels at predetermined locations, and in response thereto, activate one or more pumps to control the water level. In this regard, one or more pumps can be activated. While useful, systems can suffer from sensor or motor failures which can produce an undesirable flood condition.

Systems may also be subjected to experiencing other undesirable environmental events or conditions related to temperature, humidity, or other conditions. Control systems have been developed to monitor environmental conditions, such as temperature, in and near the location in which the pump system operates, particularly from a remote location.

One of such systems is described in U.S. application Ser. No. 15/402,483, titled "Pump Control System Having Temperature Detection and Interface for Remote Monitoring and Control", filed Jan. 10, 2017, the content of which is hereby incorporated by reference in its entirety.

However, completely replacing existing control systems may be cost prohibitive for consumers. Thus, there is a need to upgrade the functionality of existing control panels without having to replace the control panels altogether.

Moreover, legacy control panels lack standardization. That is to say, the outputs of these legacy control panels may provide output voltages ranges from 12V to 240V. Conventionally, a manufacture would produce several different models of a same controller to accommodate for various output voltages. For example, a programmable logic controller (PLC) manufacturer often creates a 24V model and a 120V model of the same PLC, but not a universal model that accepts any voltage from 24V to 120V. Examples of this include Allen-Bradley's Micro800 PLC Plug-in Modules by Rockwell Automation, Inc. of Milwaukee, Wisconsin Different models of these modules either accept inputs of 120V AC, 120/240V AC, 24V DC/AC, or 12V DC. None of the models accept a wide range of voltage inputs, namely, from 12V up to 240V. Thus, there is a need for a panel monitor that can accept a wide rage of outputs from different legacy control systems.

Figure 1:
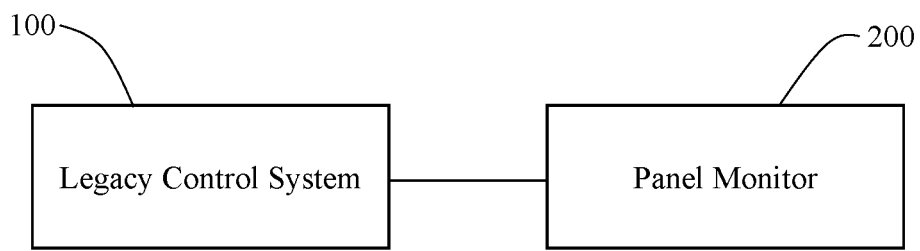
FIG. 1 illustrates a system diagram of a panel monitor being retrofitted to a legacy control system according to an exemplary embodiment.

Before explaining the disclosed embodiment of the present invention in detail, it is to be understood that the invention is not limited in its application to the details of the particular arrangement shown, since the invention is capable of other embodiments. Exemplary embodiments are illustrated in the referenced figures of the drawings. It is intended that the embodiments and figures disclosed herein are to be considered illustrative rather than limiting. Also, the terminology used herein is for the purpose of description and not of limitation.

DETAILED DESCRIPTION

Although this invention is susceptible of embodiments in many different forms, there are shown in the drawings and are described in detail herein specific embodiments with the understanding that the present disclosure is an exemplification of the principles of the invention. It is not intended to limit the invention to the specific illustrated embodiments. The features of the invention disclosed herein in the description, drawings, and claims can be significant, both individually and in desired combinations, for the operation of the invention in its various embodiments. Features from one embodiment can be used in other embodiments of the invention.

Conventionally, a preexisting or "legacy" control panel provides a certain output that is accessible by additional components or modules, such as a panel monitor. In an embodiment, the legacy control panel can be a pump controller for controlling water pumps.

To expand functionalities of the legacy control panel, an extension module or a panel monitor can be attached to the existing legacy control panel as shown in FIG. 1.

Referring to FIG. 1, a legacy control system 100 can be connected to a panel monitor 200. The legacy control system 100 and the monitor 200 can each comprise a mating connector, acting as an output and an input, respectively. For example, these mating connectors can be eight-pin connectors or twelve-pin connectors. Other suitable connectors may also be used to connect the legacy control system 100 with the panel monitor 200. Alternatively, the panel monitor 200 can be hardwired to existing circuitries of the legacy control system 100.

The legacy control system 100 can comprise a plurality of outputs, indicating different statuses that are being monitored or controlled by the legacy control system 100. In one embodiment, some of these outputs from the legacy control system 100 may indicate low level float, start level float, and high-level float of various sensors in a pump system. Additional outputs like a pump run feedback or a control power neutral may also be provided by the output of the legacy control system 100.

Figure 2:
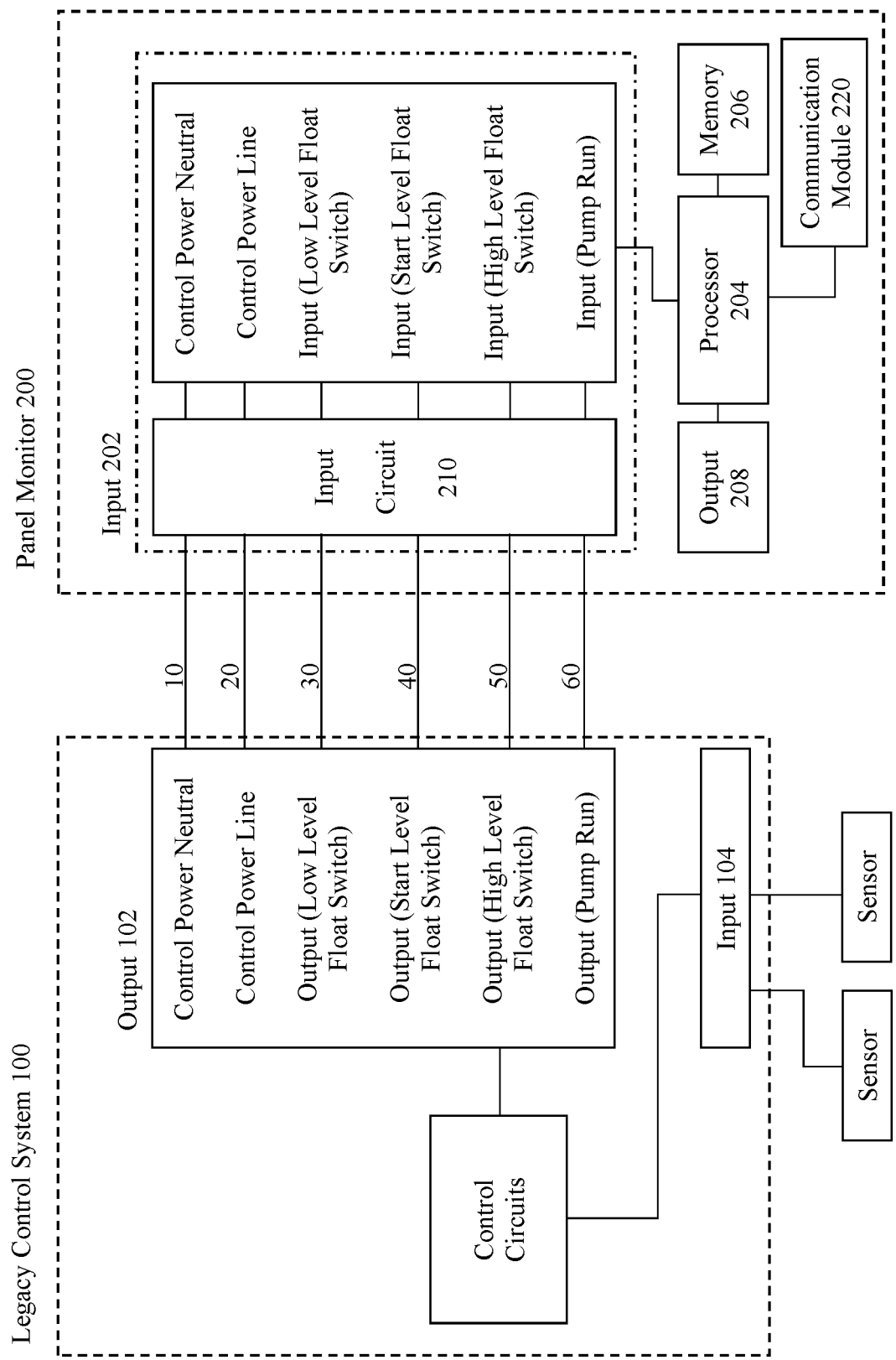
FIG. 2 illustrates a simplified block diagram of the legacy control system and the panel monitor of FIG. 1.

Referring to FIG. 2, a simplified circuit diagram between the legacy control system 100 and the panel monitor 200 is illustrated. It is to be noted that only limited components of the legacy control system 100 and of the panel monitor 200 are shown. However, the legacy control system 100 and the panel monitor 200 can contain addition components not shown in the figure. For example, in addition to control circuits, the legacy control system 100 can contain additional components such as a communicator module. For the purpose of this disclosure, the important aspect is the connection between an output 102 of the legacy control system 100 and an input 202 of the panel monitor 200, hence additional components of the individual systems are omitted for simplicity of illustration.

The legacy control system can have an output 102. The output 102 can be discrete individual outputs with individual ports, or it can combine individual outputs into a bus, serial communication interface, or a multi-pin connector.

The output 102 can have a plurality of output signals. Referring to FIG. 2, signals outputted from the output 102 can include control power neutral 10, control power line 20, low level float switch 30, start level float switch 40, high level float switch 50, or pump run 60. Of course, depending on the exact configuration of the legacy control system 100, the specific output may vary. That is to say, the output 102 can output more or less signals as the case may be for the specific legacy control system 100 than as shown in FIG. 2. For simplicity, it is contemplated that the legacy control system 100 can have an output 102 that outputs one or more output signals.

Each of the signals 10, 20, 30, 40, 50, 60 can be an electric current outputted from the output 102 of the legacy control system 100. Specifically, each of the signals 10, 20, 30, 40, 50, 60 can be alternating current (AC) or direct current (DC).

To carry information or data, the information is outputted as a voltage, with the value of the voltage corresponding to certain data. For example, a signal representing on/off states can be that when the signal is at 0V or neglectable voltage, the signal represents an off state, whereas when the signal is at 24V, it represents an on state. Typically, binary signals are represented by minimum voltage (i.e., 0V or neglectable) versus maximum voltage (i.e., 12V or 24V or 120V or 240V, as whatever the case may be for the specific legacy control system 100). However, higher-valued logic can also be used.

Using binary sequences (bit), data can be communicated from one device to another. Here, data is communicated from the legacy control system 100 to the panel monitor 200 through the output 102 and the input 202.

However, because the legacy control system 100 is a legacy system, i.e., an already existing system, the output voltage of the legacy system 100 may vary from system to system, manufacturer to manufacturer. For example, the output 102 by one manufacturer may be 12V, but the output 102 by another manufacturer may be 24V or 120V.

Figure 3:
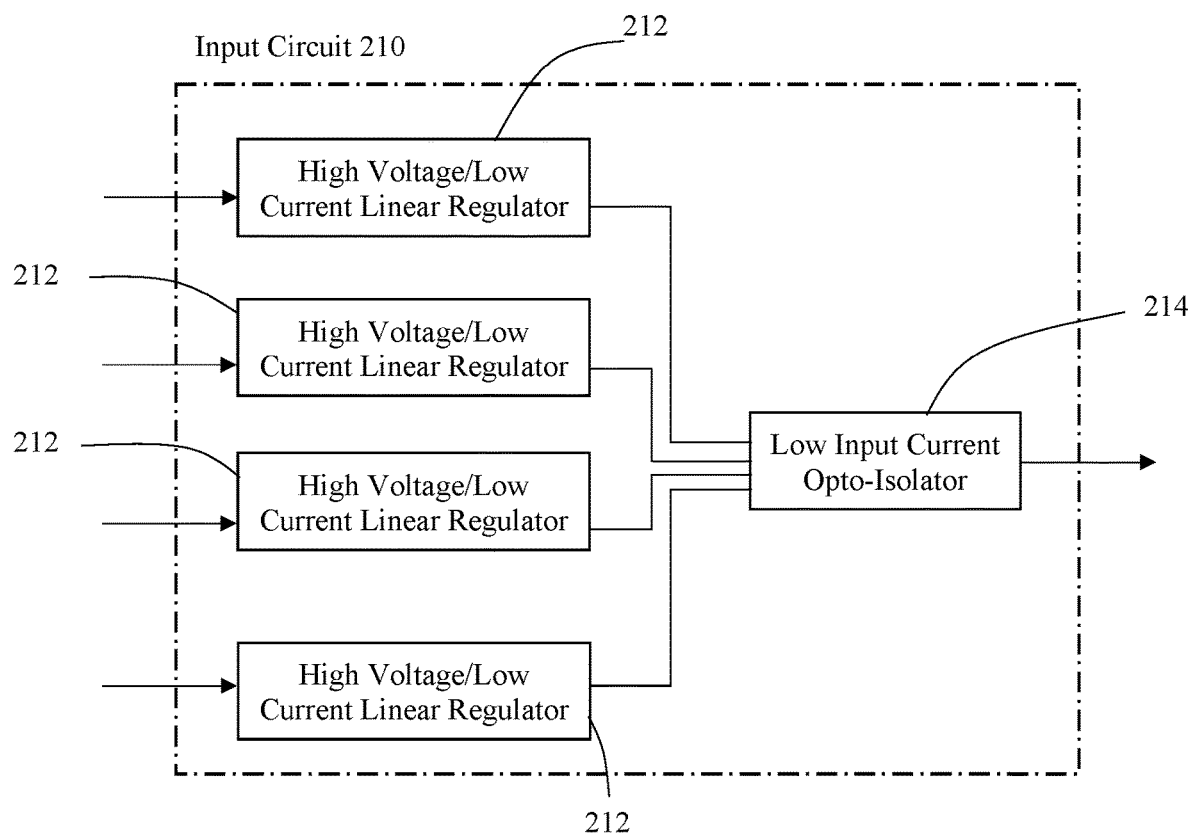
FIG. 3 illustrates a system diagram of an input circuit according to an exemplary embodiment.

To retrofit the panel monitor 200 to the legacy control system 100, the input circuit 210 can be configured to normalize the output signals received from the legacy control system 100. As shown in FIG. 3, the input circuit 210 can comprise of one or more high voltage low current linear regulators 212. These high voltage low current linear regulators 212 can accept a wide range of input voltages and supply a constant voltage output. To enable universal retrofitting of the panel monitor 200, it is preferred that the input circuit 210 can support input voltage range from 0V to about 500V. In an embodiment, the input circuit 210 can support input voltage of about 10V to 300V AC and about 15V to 450V DC.

In an exemplary embodiment, LR645 by Microchip Technology Inc. of Chandler, Arizona can be used as one of more of the high voltage low current linear regulators 212. In this embodiment, the input circuit 210 can support an input voltage range of 10 to 300V AC and 15 to 450V DC.

The input circuit 210 can also comprise a low input current opto-isolator 214. The low input current opto-isolator 214 is configured to transfer electrical signals between isolated circuits. Specifically, the low input current opto-isolator 214 prevents other components within the panel monitor 200 from receiving damaging high voltages.

Although FIG. 3 shows the input circuit 210 with four high voltage low current linear regulators 212, it is to be appreciated that the input circuit 210 can have any number of high voltage low current linear regulators 212 to accommodate output signals from the legacy control system 100. In some embodiments, the number of high voltage low current linear line regulators 212 included in the input circuit 210 can be dictated by the number of signals the input circuit 210 receives from the output 102. For example, in some embodiments, there can be a 1:1 correlation such that each of the signals 10, 20, 30, 40, 50, 60 can be coupled to a respective one of the high voltage low current linear line regulators 212.

Further, more than one low input current opto-isolator 214 can be used in the input circuit 210. Likewise, the input circuit 210 can comprise one or more sets of high voltage low current linear regulators 212 and low input current opto-isolator 214. For example, in an embodiment, the input circuit 210 can comprise two sets of circuitries, with each set comprising four high voltage low current linear regulators 212 and a low input current opto-isolator 214 respectively, accepting a total of eight inputs. In some embodiments, the number of low input current opto-isolators 214 included in the input circuit 210 can be dictated by the number of high voltage low current linear line regulators 212 included in the circuit. For example, in some embodiments, a predetermined number of the high voltage low current linear line regulators 212 can be coupled to a single one of the low input current opto-isolators 214. As such, in some embodiments, the number of low input current opto-isolators 214 included in the input circuit 210 can ultimately be dictated by the number of signals the input circuit 210 receives from the output 102.

In an embodiment, the input circuit 210 can accept up to eight signals from the legacy control system 100. In another embodiment, the input circuit 210 can accept up to sixteen signals from the legacy control system 100. Of course, the input circuit 210 can also accept less signals from the legacy control system 100.

Figure 4:
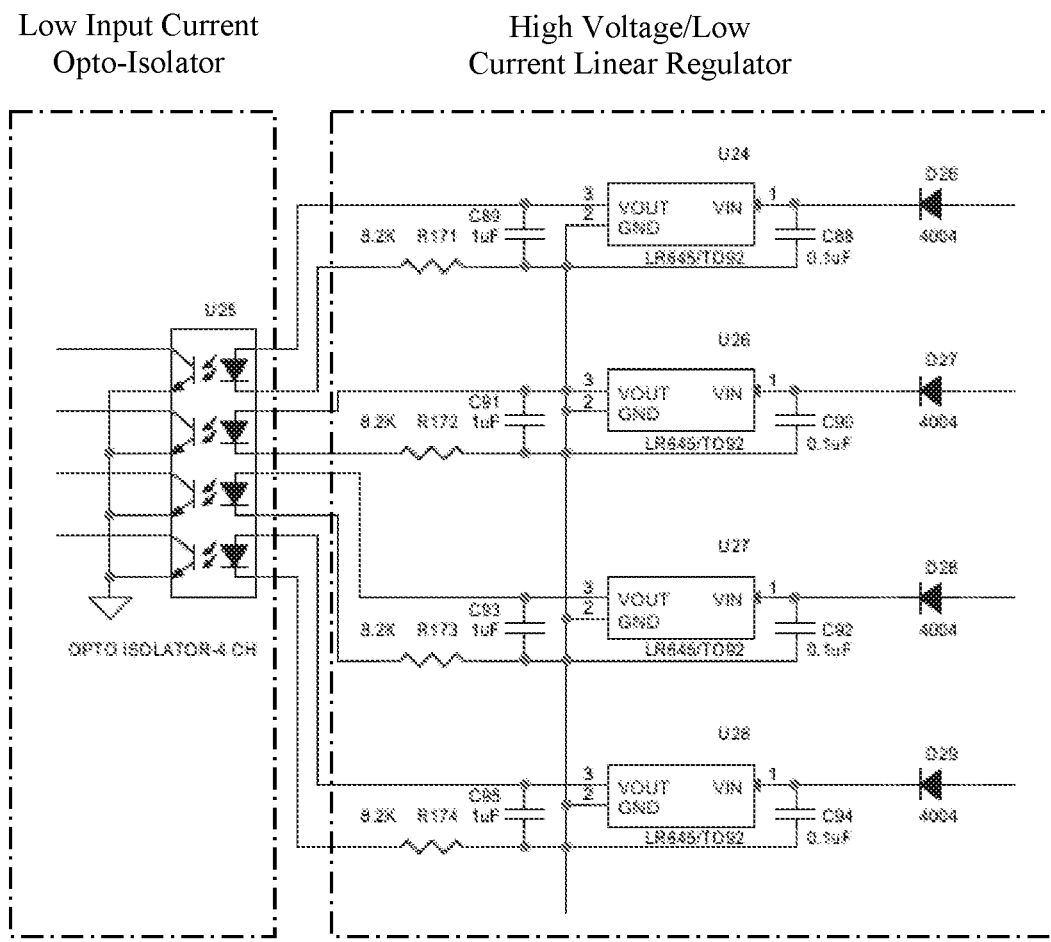
FIG. 4 illustrates a schematic of the input circuit of FIG. 3.

Referring to FIGS. 3 and 4, signals sent from the legacy control system 100 first pass through at least one of the high voltage low current linear regulators 212, which are thereby normalized before passing through the low input current opto-isolator 214 to provide an extra layer of voltage protection to the main circuitries of the panel monitor 200. Outputs of the low input current opto-isolator 214 can then be used by the panel monitor 200 for various purposes.

In addition to the input 202, the panel monitor 200 can comprise a variety of additional circuitries that provide enhanced functionalities to the legacy control system 100. By way of example, referring to FIG. 2, the panel monitor 200 can comprise a processor 204 and a memory 206. The memory 206 can be non-volatile memory and/or volatile memory such as a random-access memory (RAM). In another example, the panel monitor 200 can comprise one or more programmable logic controllers (PLC).

Additionally, the panel monitor 200 can comprise at least one output 208. The output of the panel monitor 200 can be a port for a digital signal output, or it can also be a display for displaying relevant information, an audible output for sounding an audible alarm, or a combination thereof. In an embodiment, the panel monitor 200 comprises at least one digital output rated for up to 120V AC. In another embodiment, the panel monitor 200 comprises up to four digital outputs rated for up to 240V AC or DC. In some embodiments, the output 208 can comprise an external serial communication interface that provides connectivity to additional components.

In some embodiments, the panel monitor 200 can comprise a communication module 220 that enables the panel monitor 200 to communicate with an external or internal network. For example, the communication module can be an ethernet port, allowing the panel monitor 200 to be connected to internet or intranet. In another example, the communication module can be a wireless card that enables the panel monitor 200 to be connected to a network wirelessly through WiFi and/or cellular. The communication module can enable the panel monitor 200 to communicate with a network through hardwire, internet, intranet, infrared (IR), Bluetooth, near-field communication (NFC), or other suitable communication protocols. In addition, the network contemplated herein can be a local-area network (LAN) and/or a wide-area network (WAN).

According to an embodiment, the communication module 220 can be a ME910C1 communication module manufactured by Telit of London, England. However, additional or alternate communication modules can also be used.

Figure 5:
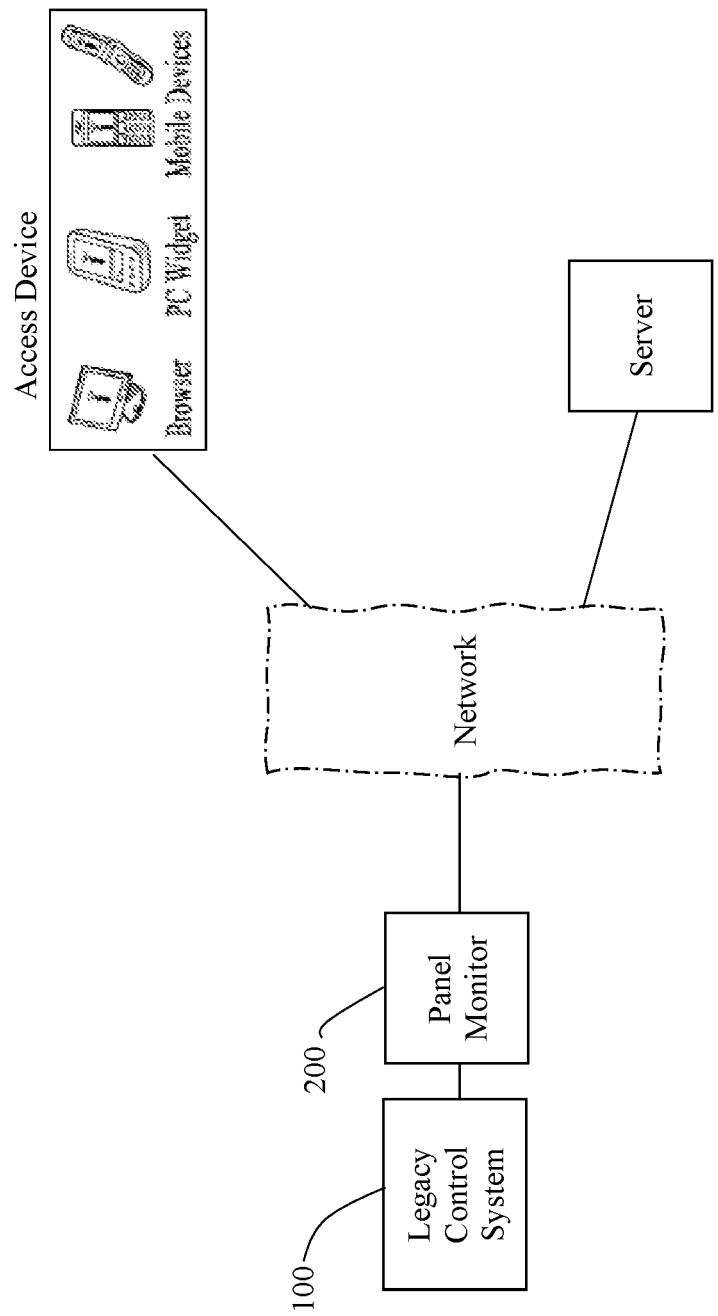
FIG. 5 illustrates a block diagram of a system utilizing a panel monitor according to an embodiment.

Through the communication module 220, the panel monitor 200 can be connected to a remote or cloud server, thus enabling real-time remote status monitoring or controlling. Referring to FIG. 5, the remote server can be configured to provide an alarm to an operator through in a variety of ways such as electronic mail (email), a short message service (SMS), a multimedia message service (MMS), an instant message (IM), or a telephone call. For example, the operator can monitor the levels of control float switches or pump run feedback and receive alarms such as seal fail, high or low level, pump fail or excessive run time through an access device. The access device can be a personal computer, a browser, a mobile phone, a tablet, or a personal digital assistant (PDA). Likewise, through the remote or cloud server, statistical data pertaining to the legacy control system 100 can be stored and/or analyzed.

In an example, the legacy control system 100 does not provide network connectivity, thus an operator is required to be onsite to monitor the statuses of various pumps being monitored by the legacy control system 100. By retrofitting the panel monitor 200 onto the legacy control system 100, the legacy control system 100 can gain network connectivity through the panel monitor 200, if said panel monitor 200 has a communication module. Alternatively, the panel monitor 200 can serve as a bridge or a gateway that enables additional components or modules to be added to the legacy control system 100 through the panel monitor 200.

Specific embodiments of a panel monitor for retrofitting existing control panels according to the present invention have been described for the purpose of illustrating the manner in which the invention can be made and used. It should be understood that the implementation of other variations and modifications of this invention and its different aspects will be apparent to one skilled in the art, and that this invention is not limited by the specific embodiments described. Features described in one embodiment can be implemented in other embodiments. The subject disclosure is understood to encompass the present invention and any and all modifications, variations, or equivalents that fall within the spirit and scope of the basic underlying principles disclosed and claimed herein.

What is claimed is:

1. A panel monitor for retrofitting to a legacy control system comprising:
    a wide voltage range input to receive digital signals from the legacy control system;
    a processor and at least one memory device coupled to the wide voltage range input; and
    a communication module coupled to the processor,
    wherein wide voltage range input is configured to receive the digital signals ranging from 0V to 500V, and
    wherein the wide voltage range input further comprises an input circuit that comprises at least one high voltage low current linear regulator that is coupled to a low input current opto-isolator.

2. The panel monitor of claim 1, wherein the wide voltage range input is configured to receive the digital signals ranging from 10V to 300V AC and 15V to 450V DC.

3. The panel monitor of claim 1, wherein the input circuit comprises a plurality of sets of circuitries, each comprising a respective high voltage low current linear regulator that is coupled to a respective low input current opto-isolator.

4. The panel monitor of claim 1, wherein the communication module is configured to connect with a remote network through at least one of a WiFi or cellular protocol.

5. The panel monitor of claim 1 further comprising an output coupled to the processor.

6. The panel monitor of claim 5, wherein the output is a serial communication interface.

* * * * *